United States Patent

(12) United States Patent
Hsiao

(10) Patent No.: US 8,014,440 B2
(45) Date of Patent: Sep. 6, 2011

(54) FREQUENCY ADJUSTING METHOD OF A CDR CIRCUIT AND APPARATUS THEREOF

(75) Inventor: Chin-Fa Hsiao, Taipei (TW)

(73) Assignee: VIA Technologies, Inc., Taipei (TW)

( * ) Notice: Subject to any disclaimer, the term of this patent is extended or adjusted under 35 U.S.C. 154(b) by 998 days.

(21) Appl. No.: 11/712,962

(22) Filed: Mar. 2, 2007

(65) Prior Publication Data

US 2008/0043892 A1     Feb. 21, 2008

(30) Foreign Application Priority Data

Aug. 18, 2006 (TW) .............................. 95130473 A

(51) Int. Cl.
H04B 1/38      (2006.01)
H04L 5/16      (2006.01)

(52) U.S. Cl. ........ 375/220; 375/221; 375/225; 375/358; 327/99; 327/147; 327/298

(58) Field of Classification Search .......... 375/219–221, 375/358–361, 225; 327/99, 147, 298, 100, 327/141, 144, 146
See application file for complete search history.

(56) References Cited

U.S. PATENT DOCUMENTS

| | | | |
|---|---|---|---|
| 6,323,713 B1 | 11/2001 | Yuzue | |
| 7,437,079 B1 * | 10/2008 | Hofmeister et al. | 398/138 |
| 2003/0039207 A1 * | 2/2003 | Maeda et al. | 370/216 |
| 2006/0026315 A1 * | 2/2006 | Hong et al. | 710/60 |
| 2006/0115035 A1 | 6/2006 | Yu et al. | |
| 2006/0215296 A1 * | 9/2006 | Latchman | 360/51 |

* cited by examiner

*Primary Examiner* — Dac V Ha
*Assistant Examiner* — James M Perez
(74) *Attorney, Agent, or Firm* — Bacon & Thomas, PLLC

(57) ABSTRACT

A frequency adjusting method of a CDR circuit and apparatus thereof are provided. The adjusting method is applied to a receiver apparatus connected to an outer apparatus. The outer apparatus, after actuated, sends out an outer data signal to the receiver apparatus according to its operational frequency and a PLL of the receiver apparatus outputs a transmitter clock according to an operational frequency of the receiver apparatus. The CDR circuit of the receiver apparatus generates a receiver clock according to the outer data signal. The CDR circuit is set in a phase mode such that the receiver clock follows transmitting frequency of the outer data signal. Then, a difference between frequencies of the receiver clock and the transmitter clock is checked. If the difference is larger than a threshold value, an operational frequency of the outer data signal is reduced.

21 Claims, 3 Drawing Sheets

FREQUENCY ADJUSTING METHOD OF A CDR CIRCUIT AND APPARATUS THEREOF

This application claims the benefit of Taiwan application Serial No. 95130473, filed Aug. 18, 2006, the subject matter of which is incorporated herein by reference.

BACKGROUND OF THE INVENTION

1. Field of the Invention

The invention relates in general to a frequency adjusting method and apparatus, and more particularly to a frequency adjusting method of a clock/data recovery (CDR) circuit and apparatus thereof.

2. Description of the Related Art

The conventional interface standard of parallel advanced technology attachment (PATA) is a kind of parallel data processing and is very inconvenient in usage owing that it has a great amount of wiring to occupy much space and its cables are too short to transmit stable signals. Therefore, due to requirements of convenience, stability and operational frequency, serial advanced technology attachment (SATA) has developed as a new generation of interface standard between a system and hard disk and will be designed to have an operational frequency of 6 Gbps in a scenario of technology development.

In the present market, the SATA-related product has a specification of STAT 1.0 and has an operational frequency of 1.5 Gbps. The new-generation SATA II has an operational frequency of 3 Gbps. When the two generations of products are connected for transmitting data, there usually comes out a problem due to different operational frequencies. For example, when a SATA 1.0 apparatus is used as a receiver and an SATA II apparatus is used as a transmitter for transmitting data to the receiver, due to different operational frequencies of the two apparatuses, the clock/data recovery (CDR) circuit in the lower-frequency receiver will follow the operational frequency of the transmitter. After a period of time, the frequency of the CDR circuit will go over an allowed operational range, be even locked to the operational frequency of the transmitter, and be unable to return to its own frequency.

When the SATA specification is changing between generations, connection between apparatuses of different SATA generations must result in problems due to their different operational frequencies. How to avoid an abnormal operation of the receiver apparatus due to frequency dispersion is an essential subject for a SATA product designer.

SUMMARY OF THE INVENTION

The invention is directed to a frequency adjusting method of a CDR circuit and apparatus thereof which is applied to a receiver apparatus connected to an outer apparatus. When actuated, the outer apparatus transmits an outer data signal to the receiver apparatus. The receiver apparatus includes a phase-lock loop (PLL) and a CDR circuit. The PLL outputs a transmitter clock according to an operational frequency of the receiver apparatus and the CDR circuit generates a receiver clock according to the outer data signal or transmitter clock. When the CDR circuit is set in a phase mode, the receiver clock follows a transmitting frequency of the outer data signal and whether a difference between the frequency of the receiver clock and transmitter clock is larger than a threshold value is checked. When the difference is larger than the threshold value, the outer apparatus is set to operate in the operational frequency of the receiver apparatus.

According to a first aspect of the present invention, a frequency adjusting method of a CDR circuit is provided. The method is applied to a receiver apparatus connected to an outer apparatus, the receiver apparatus comprises a PLL and a CDR circuit, the PLL outputs a transmitter clock according to an operational frequency of the receiver apparatus, and the CDR circuit generates a receiver clock according to an outer data signal of the outer apparatus. The frequency adjusting method comprises setting the CDR circuit in a phase mode such that the receiver clock follows frequency of the outer data signal; checking whether a difference between frequencies of the receiver clock and the transmitter clock is larger than a threshold value; and when the difference is larger than the threshold value, setting an operational frequency of the outer apparatus equal to the operational frequency of the receiver apparatus.

According to a second aspect of the present invention, a receiver apparatus for receiving an outer data signal of an outer apparatus is provided. The receiver apparatus comprises a PLL, a CDR circuit and a frequency detector. The PLL is for outputting a transmitter clock according to an operational frequency of the receiver apparatus. The CDR circuit is for receiving the outer data signal and outputting a receiver clock. The receiver clock follows the outer data signal when the CDR circuit is set in a phase mode and follows the transmitter clock when the CDR circuit is set in a frequency mode. The frequency detector is for outputting a dispersion detective signal. When the CDR circuit is set in the phase mode, and the frequency detector outputs the dispersion detective signal, the CDR circuit is switched to the frequency mode, otherwise, the CDR circuit remains in the phase mode.

According to a third aspect of the present invention, a frequency adjusting method of a receiver apparatus is provided. The receiver apparatus operates in a first operational frequency, the receiver apparatus is connected to an outer apparatus and adjusts a receiver clock for receiving an outer data signal, and the outer apparatus operates in a second operational frequency. The frequency adjusting method comprises setting the receiver clock to follow the second operational frequency; detecting the receiver clock has a frequency beyond a normal operational value; and setting the outer apparatus to operate in the first operational frequency. The receiver clock follows the first operational frequency when the receiver apparatus is not connected to the outer apparatus.

The invention will become apparent from the following detailed description of the preferred but non-limiting embodiments. The following description is made with reference to the accompanying drawings.

DETAILED DESCRIPTION OF THE INVENTION

The invention provides a frequency adjusting method of a CDR circuit applied to a receiver apparatus with a first-generation SATA interface. For example, an extra frequency detector is used in a south-bridge chip to check whether the CDR circuit has frequency dispersion due to following the transmitting frequency of the outer data signal. Besides, the invention further provides another frequency adjusting method of a CDR circuit. By using a controller of the receiver apparatus to switch the CDR circuit between a frequency mode and phase mode, the frequency dispersion of the CDR circuit can be prevented.

Figure 1:
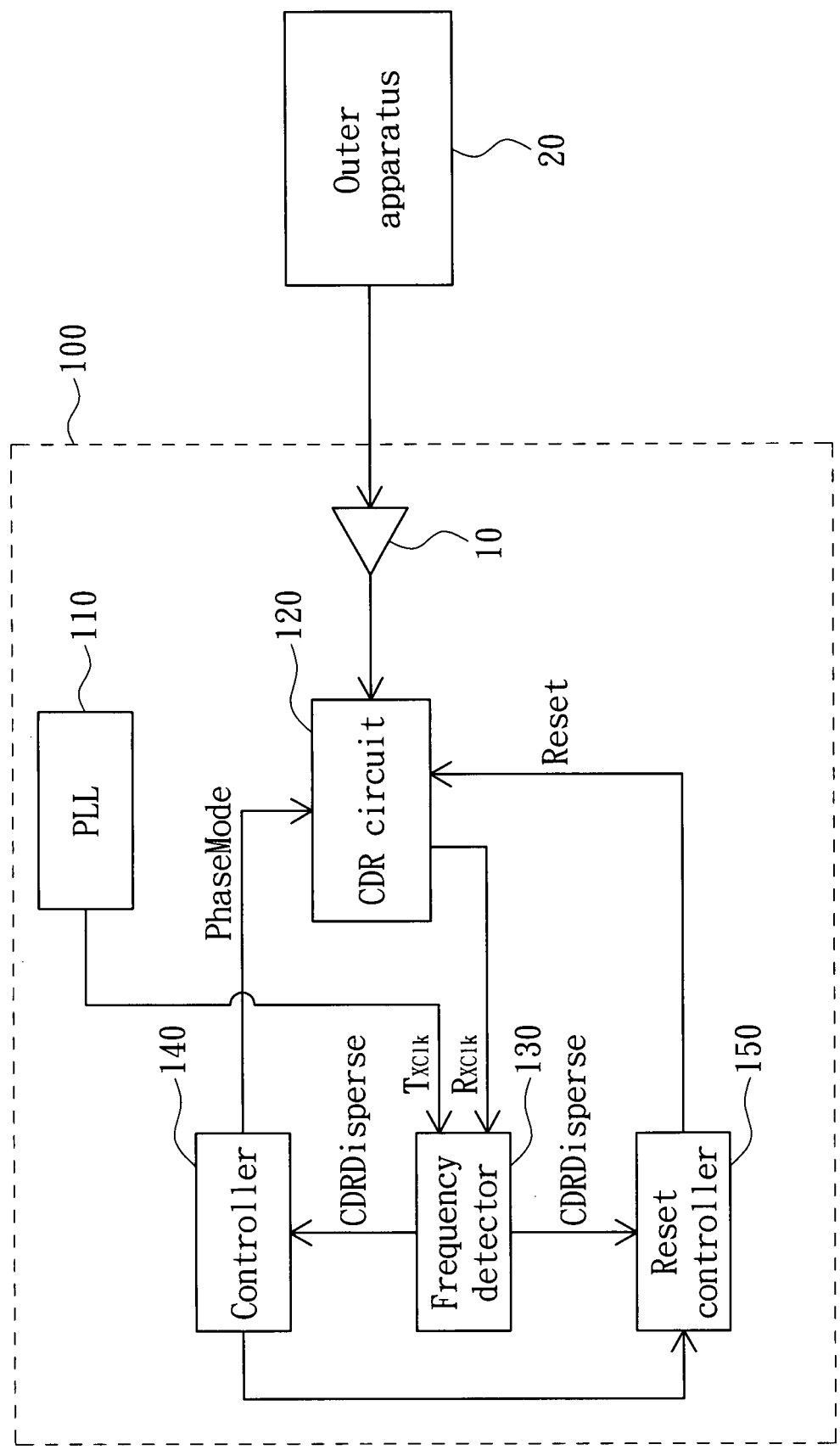
FIG. 1 is a block diagram of a receiver apparatus according to a preferred embodiment of the invention.

Referring to FIG. 1, a block diagram of a receiver apparatus according to a preferred embodiment of the invention is shown. A receiver apparatus 100 with the first-generation SATA interface, such as a south-bridge chip, is operated in a first operational frequency (1.5 Gbps) to continuously receive an outer data signal. An outer apparatus 20 with a second-generation SATA interface can be operated in the first operational frequency and a second operational frequency (3 Gbps). The first operational frequency is lower than the second operational frequency. When actuated, the outer apparatus 20 sends out an outer data signal to the receiver apparatus 100 in the second operational frequency.

The receiver apparatus 100 includes a reception terminal 10, a PLL 110, a CDR circuit 120, a frequency detector 130 and a controller 140. The reception terminal 10 is for continuously receiving the outer data signal such that the receiver apparatus 100 can process the outer data signal. The PLL 110 outputs a transmitter clock TxClk according to the first operational frequency of the receiver apparatus 100. The CDR circuit 120 is for receiving the outer data signal and outputting a receiver clock RxClk. When the CDR circuit 120 is set in a phase mode, the receiver clock RxClk adjusts its frequency by following the phase of the outer data signal. When the CDR circuit 120 is set in a frequency mode, the receiver clock RxClk follows frequency of the transmitter clock TxClk. The frequency detector 130 is for detecting whether a difference between the frequency of the receiver clock TxClk and transmitter clock RxClk is larger than a threshold value. The controller 140 switches the CDR circuit between the phase mode and frequency mode according to a detection result of the frequency detector 130.

Besides, the receiver apparatus 100 further includes a reset controller 150 for preventing frequency dispersion of the CDR circuit. When the difference between the frequency of the receiver clock RxClk and transmitter clock TxClk is larger than a threshold value, the reset controller 150 outputs a reset signal Reset to reset the receiver apparatus 100.

In the following description, how the receiver apparatus 100 in the preferred embodiment of the invention achieves the purpose of frequency adjustment is illustrated in details. When the receiver apparatus 100 is not connected to the outer apparatus 20 to receive a data signal, the CDR circuit 120 generates the receiver clock RxClk according to the frequency (1.5 Gbps) of the transmitter clock TxClk of the PLL 110, that is, the first operational frequency of the receiver apparatus 100. The receiver clock RxClk provides an operational frequency of all elements in the receiver apparatus 100.

Owing that the receiver apparatus 100 and the outer apparatus 20 have individual clock generators, such as the PLL 100 used in the receiver apparatus 100, for providing the required operational frequency, when the receiver apparatus 100 is connected to the outer apparatus 20 to transmit the data signal, the clock frequency of the two apparatuses has to be synchronized such that the outer data signal can be normally transmitted.

When the CDR circuit 120 is set in a phase mode, the receiver clock RxClk will follow the phase of the outer data signal to lock at the correct operational frequency for transmitting data. When the CDR circuit 120 is operated in the frequency mode, the receiver clock RxClk will follow the operational frequency of the receiver apparatus 100. Therefore, the invention adjusts operational frequency through mode-switching of the CDR circuit to avoid frequency dispersion.

When the receiver apparatus 100 is connected to the outer apparatus 20, the PLL 110 generates the transmitter clock TxClk of the first operational frequency. At the time, the CDR circuit 120 is operated in the frequency mode, and the receiver clock RxClk follows the transmitter clock TxClk, that is, has a frequency equal to the first operational frequency. Afterward, the controller 140 switches the CDR circuit to the phase mode such that the receiver clock RxClk is locked at the phase and frequency of the outer data signal and thus the receiver apparatus 100 and outer apparatus 20 can be synchronized. However, owing that the receiver apparatus 100 and outer apparatus 20 are apparatuses with different generations of SATA interfaces, the initial receiver clock RxClk cannot be locked at the phase and frequency of the outer data signal and thus the CDR circuit 120 has to relatively increase the frequency of the receiver clock RxClk to catch up the outer data signal.

When the frequency detector 130 detects that the difference between the adjusted receiver clock RxClk and the transmitter clock TxClk is larger than a threshold value, that is, the operational frequency of the receiver apparatus 100 is much lower than that of the outer apparatus 20, the frequency detector 130 sends out a dispersion detective signal CDRDisperse to the reset controller 150 and controller 140. The reset controller 150, after receiving the dispersion detective signal CDRDisperse, sends out a reset signal Reset to the CDR circuit 120 to restart the CDR circuit 120. The controller. 140 is switched to the frequency mode according to the dispersion detective signal CDRDisperse after the CDR circuit 120 is restarted.

When restarted, the CDR circuit 120 is set in the frequency mode to follow the frequency of the transmitter clock TxClk again and then switched to the phase mode to check whether the frequency of the outer data signal can be caught up. In the process, the outer apparatus 20 cannot receive any response from the receiver apparatus 100. If the receiver apparatus 100 does not respond after a period of time, that is, the CDR circuit 120 cannot increase the frequency of the receiver clock RxClk to the second operational frequency, the outer apparatus 20 will reduce the operational frequency to the first operational frequency such that the receiver clock RxClk can be adjusted to synchronize with the outer apparatus 20 in frequency and thus the data signal can be normally transmitted.

A waiting time is set in the outer apparatus 20, which is the time the above outer apparatus 20 waits for response from the receiver apparatus 100. If the waiting time is exceeded, the outer apparatus 20 determines that the receiver apparatus 100 cannot catch up the second operational frequency and automatically reduces its operational frequency to the first operational frequency. Generally speaking, the waiting time of the outer apparatus 20 is about 54 µs.

Figure 2:
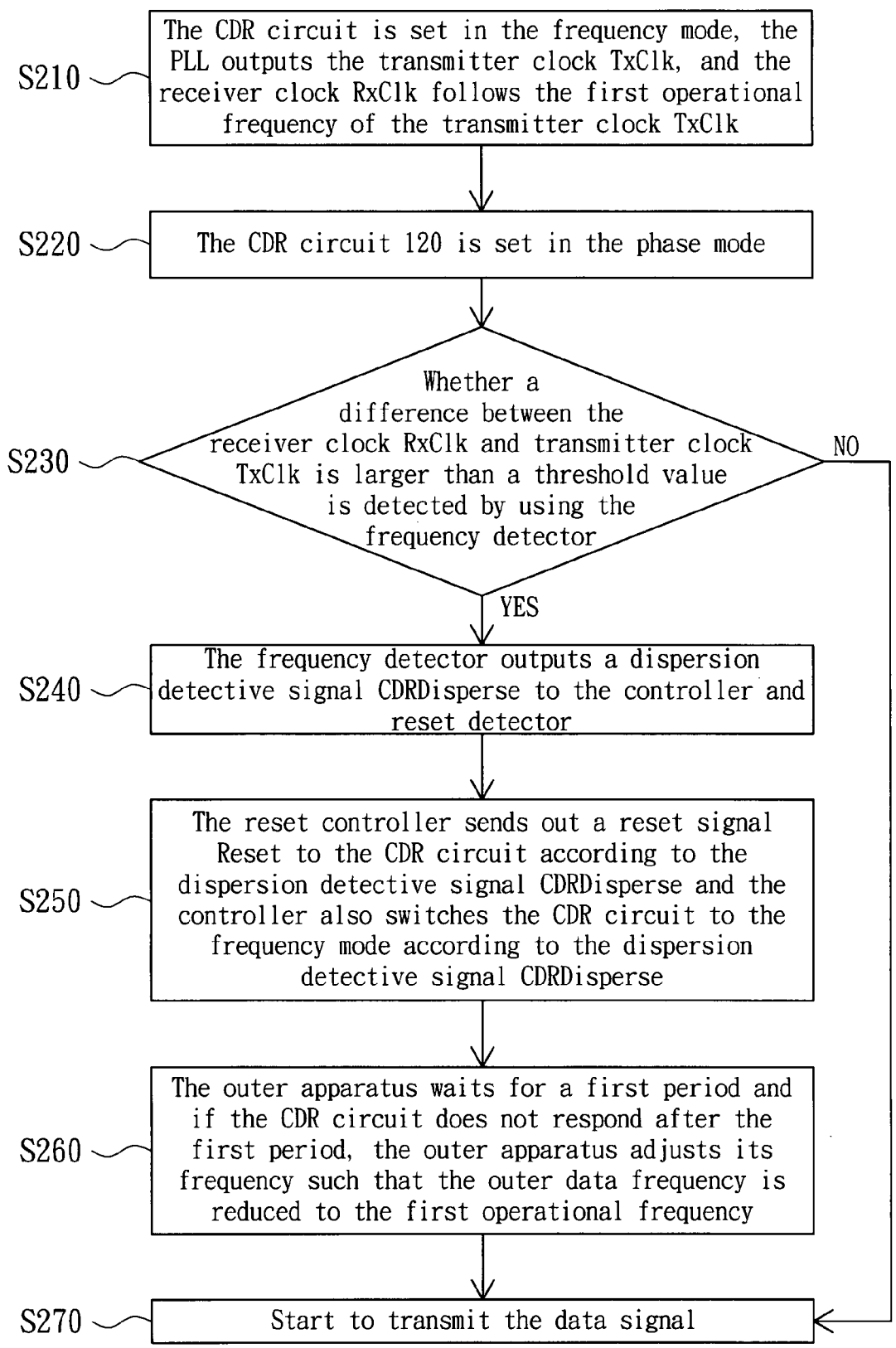
FIG. 2 is a flowchart of a frequency adjusting method according to a first embodiment of the invention.

Referring to FIG. 2, a flowchart of a frequency adjusting method according to a first embodiment of the invention is shown. First, in step S210, the CDR circuit 120 is set in the frequency mode, the PLL 110 outputs the transmitter clock TxClk, and the receiver clock RxClk follows the first operational frequency of the transmitter clock TxClk. In step S220, the CDR circuit 120 is set in the phase mode. As mentioned above, when the CDR circuit 120 is set in the phase mode, the receiver clock RxClk will follow a transmitting frequency of the outer data signal, i.e. the second operational frequency.

Following that, in step S230, whether a difference between the receiver clock RxClk and transmitter clock TxClk is larger than a threshold value, such as 15 Mbps, is detected by using the frequency detector 130. Because the receiver clock RxClk has to follow the outer data clock such that the outer apparatus 20 can transmit the data signal to the receiver apparatus 100, the receiver clock RxClk has to increase its frequency to catch up the second operational frequency of the outer data clock. If the difference between the receiver clock RxClk and transmitter clock TxClk is larger than the threshold value, such as a difference between the maximum operational frequency of the CDR circuit 120 and frequency of the transmitter clock TxClk, the CDR circuit 120 may be dispersed in frequency and end with an error operation.

If the difference between the receiver clock RxClk and transmitter clock TxClk in the step S230 is larger than the threshold value, it represents the CDR circuit 120 may be dispersed in frequency, in step S240, the frequency detector 130 outputs a dispersion detective signal CDRDisperse to the controller 140 and reset detector 150.

Then, in step S250, the reset controller 150 sends out a reset signal Reset to the CDR circuit 120 according to the dispersion detective signal CDRDisperse and the controller 140 also switches the CDR circuit 120 to the frequency mode according to the dispersion detective signal CDRDisperse. At the time, the outer apparatus 20 will not receive any response from the CDR circuit 120 owing that the CDR circuit 120 is being restarted.

In step S260, the outer apparatus 20 waits for a first period. If the CDR circuit 120 does not respond after the first period, the outer apparatus 20 adjusts its frequency such that the outer data frequency is reduced to the first operational frequency. The first period is the waiting time of the outer apparatus 20. In this step, owing that the CDR circuit 120 cannot be operated in a higher second operational; frequency and the receiver clock RxClk cannot catch up the outer data frequency, the outer apparatus 20 correspondingly reduces its operational frequency to the first operational frequency such that the receiver clock RxClk can follow the outer data frequency. Next, in step S270, it starts to transmit the data signal.

In the step S230, the difference between the receiver clock RxClk and transmitter clock TxClk is not larger than the threshold value, which represents the CDR circuit 120 can be normally operated in the higher second operational frequency, proceed to the step S270 in which the receiver apparatus 100 starts to read data carried by the outer data signal.

In the frequency adjusting method disclosed by the embodiment, an extra frequency detector 130 is disposed in the receiver apparatus 100 with the first generation SATA interface to determine whether the frequency of the CDR circuit 120 exceeds the operational frequency of the receiver apparatus 100 by a threshold value. Therefore, the invention needs only a small amount of extra circuit areas and gates of the original receiver apparatus 100 to achieve the purpose of preventing the CDR circuit from frequency dispersion.

In another embodiment of the invention, the frequency detector 130 can be used to detect whether the frequency of the receiver clock RxClk is equal to that of the transmitter clock TxClk and accordingly generating the dispersion detective signal CDRDisperse. The controller 140 receives the dispersion detective signal CDRDisperse of the frequency detector 130 to switch the CDR circuit 120 between the phase mode and frequency mode. The reset controller 150 also outputs a reset signal Reset to reset the receiver apparatus 100 according to the dispersion detective signal CDRDisperse.

In the following description, how the receiver apparatus 100 achieves the purpose of frequency adjustment is illustrated in details. When two different generations of SATA apparatuses are connected to transmit data, due to different operational frequencies of the two apparatuses, the receiver apparatus of the first-generation SATA apparatus cannot read the outer data signal transmitted by the outer apparatus of the second-generation SATA apparatus. In this situation, the receiver apparatus 100 of the embodiment determines the operational frequency of the outer apparatus 20 is higher than its own operational frequency and the outer apparatus 20 is controlled to reduce its operational frequency such that the receive apparatus 100 and outer apparatus 20 can be operated in the same operational frequency.

As mentioned in the previous embodiment, the CDR circuit 120 is set in the frequency mode at first such that the receiver clock RxClk follows the transmitter clock TxClk whose frequency is the first operational frequency. Next, the CDR circuit 120 is switched to the phase mode such that the receiver clock RxClk follows the outer data signal. Owing that the outer data signal has a higher operational frequency (the second operational frequency), the receiver clock RxClk increases its frequency gradually. If the frequency detector 130 detects that the receiver clock RxClk differs from the transmitter clock TxClk, that is, the operational frequency of the receiver apparatus 100 differs from that of the outer apparatus 20, the frequency detector 130 sends out a dispersion detective signal CDRDisperse to the controller 140 and reset controller 150.

After receiving the dispersion detective signal CDRDisperse, the reset controller 150 sends out a reset signal Reset to the CDR circuit 120 to restart the CDR circuit 120. In this process, the outer apparatus 20 will not receive any response from the receiver apparatus 100 and wait for a waiting time. If the receive apparatus 100 does not respond continuously over the waiting time, the outer apparatus 20 will reduce its operational frequency for the receiver apparatus 100 to catch up.

The controller 140, after restarted, also switches the CDR circuit 120 to the frequency mode according to the dispersion detective signal CDRDisperse such that the receiver clock RxClk can follow the transmitter clock TxClk again. Owing that the outer apparatus 20 has reduced its operational frequency to the first operational frequency, when the controller 140 switches the CDR circuit 120 to the phase mode, the receiver clock RxClk and outer data signal are both in the first operational frequency. Therefore, the CDR circuit 120 does not need to adjust the frequency of the receiver clock RxClk and the outer apparatus 20 can transmit data normally to the receiver apparatus 100.

Figure 3:
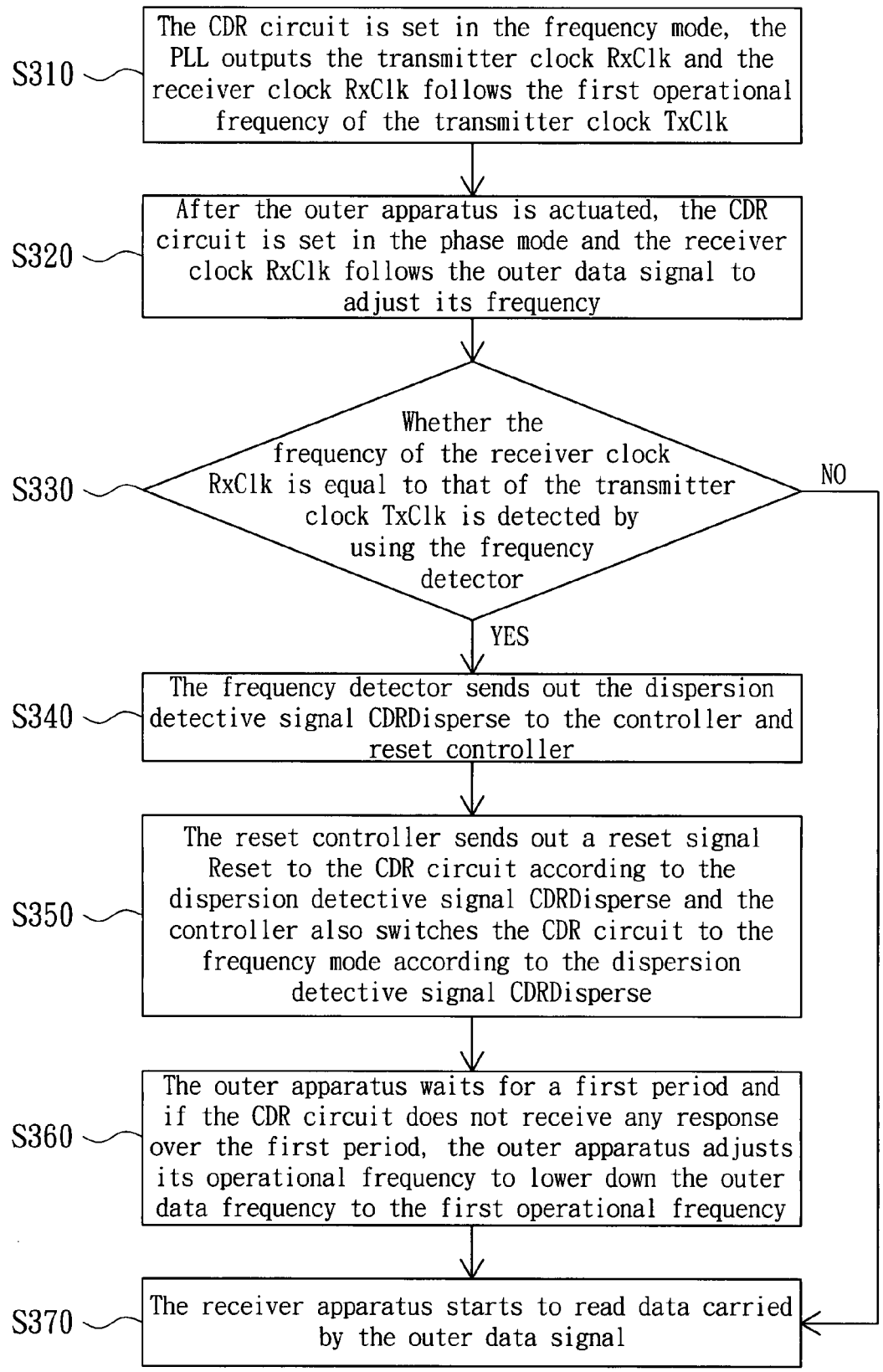
FIG. 3 is a flowchart of the frequency adjusting method according to a second embodiment of the invention.

Referring to FIG. 3, a flowchart of the frequency adjusting method according to a second embodiment of the invention is shown. First, in step S310, the CDR circuit 120 is set in the frequency mode, the PLL 110 outputs the transmitter clock RxClk and the receiver clock RxClk follows the first operational frequency of the transmitter clock TxClk. After the outer apparatus 20 is actuated, the CDR circuit 120 is set in the phase mode and the receiver clock RxClk follows the outer data signal to adjust its frequency as shown in step S320.

Next, in step S330, whether the frequency of the receiver clock RxClk is equal to that (1.5 Gbps) of the transmitter clock TxClk is detected by using the frequency detector 130. If the operational frequency of the outer apparatus 20 is the second operational frequency, the receiver clock RxClk will increase its frequency from the first operational frequency to follow the frequency of the outer data signal TxClk.

In step S340, if the receiver clock RxClk differs from the transmitter clock TxClk, the frequency detector 130 sends out the dispersion detective signal CDRDisperse to the controller 140 and reset controller 150.

In step S350, the reset controller 150 sends out a reset signal Reset to the CDR circuit 120 according to the dispersion detective signal CDRDisperse and the controller 140 also switches the CDR circuit 120 to the frequency mode according to the dispersion detective signal CDRDisperse. At the time, the outer apparatus 20 will not receive any response owing that the CDR circuit 120 is being restarted.

In step S360, the outer apparatus 20 waits for a first period. If the CDR circuit 120 does not receive any response over the first period, the outer apparatus 20 adjusts its operational frequency to lower down the outer data frequency to the first operational frequency, wherein the first period is a waiting time of the outer apparatus 20. In the step, owing that the adjustment result of the CDR circuit 120 shows that the receiver apparatus 100 and outer apparatus 20 have different operational frequencies, the outer apparatus 20 correspondingly reduces its operational frequency to the first operational frequency such that the receiver apparatus 100 and outer apparatus 20 can transmit data in the same operational frequency to ensure that the receiver apparatus 100 will not disperse in frequency and data can be transmitted correctly. Afterward, in step S370, the receiver apparatus 100 starts to read data carried by the outer data signal.

If the outer apparatus 20 has decreased its operational frequency to the first operational frequency, that is, after the receiver clock RxClk enters the phase mode, the frequency of the outer data signal followed by the receiver clock RxClk has the same frequency as the transmitter clock TxClk, directly proceed to the step S370 to start to transmit the data signal.

The difference between the embodiments of FIG. 2 and FIG. 3 lies in the CDR circuit will control the receiver clock RxClk to keep following the frequency of the outer apparatus to transmit the data signal if the receiver apparatus can be normally operated in the higher second operational frequency in the embodiment of FIG. 2. If the receiver apparatus cannot be operated in the higher second operational frequency, the operational frequency of the outer apparatus is lowered down for the receiver apparatus to catch up. In the embodiment of FIG. 3, whether the operational frequencies of the receiver apparatus and outer apparatus are equal is checked. If the two frequencies are different, the operational frequency of the outer apparatus is reduced while if the two frequencies are the same, the data are normally transmitted.

In order to prevent the CDR circuit of the receiver apparatus from being dispersed in frequency as following the operational frequency of the outer apparatus, the conventional method is to reset the receiver apparatus after a constant period such that the frequency of the CDR circuit can return to the operational frequency of the receiver apparatus. However, repeatedly resetting the receiver apparatus will result in reduction of the sensibility of the voltage controlled oscillator (VCO) in the CDR circuit. The receiver apparatus of the invention suitably switches the CDR circuit between the frequency mode and phase mode to prevent frequency dispersion of the CDR circuit. Compared to the conventional method, the method of the invention is more simplified and will not reduce sensibility of the VCO. In the meanwhile, the frequency adjusting method of a CDR circuit provided by the invention can be applied to any two apparatuses with different generations of serial high-level technology connection interfaces to resolve the frequency dispersion problem of the CDR circuit in data transmission between the two apparatuses.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A frequency adjusting method of a clock/data recovery (CDR) circuit, applied to a receiver apparatus connected to an outer apparatus, the receiver apparatus comprising a phase-lock loop (PLL) and a CDR circuit, the PLL outputting a transmitter clock according to an operational frequency of the receiver apparatus, the CDR circuit generating a receiver clock according to an outer data signal of the outer apparatus, the frequency adjusting method comprising:
   (a) setting the CDR circuit in a phase mode such that the receiver clock follows frequency of the outer data signal;
   (b) checking whether a difference between frequencies of the receiver clock and the transmitter clock is larger than a threshold value; and
   (c) when the difference is larger than the threshold value, sending a reset signal from the receiver apparatus to restart the CDR circuit and switching the operational frequency of the outer apparatus according to the operational frequency of the receiver apparatus, and setting an operational frequency of the outer apparatus equal to the operational frequency of the receiver apparatus.

2. The frequency adjusting method according to claim 1, wherein before step (c), the operational frequency of the receiver apparatus is lower than the operational frequency of the outer apparatus.

3. The frequency adjusting method according to claim 1, further comprising:
   operating the CDR circuit in a frequency mode such that the receiver clock follows the transmitter clock when the outer apparatus is connected to the receiver apparatus.

4. The frequency adjusting method according to claim 1, wherein the step (c) further comprises:
   when the difference is smaller than the threshold value, setting the receiver apparatus to keep following the frequency of the outer data signal, the threshold value is a difference between the maximum operational frequency of the receiver apparatus and a predetermined operational frequency, or a rational optimal value.

5. The frequency adjusting method according to claim 4, further comprising:
   setting the CDR circuit in the frequency mode such that the receiver clock follows the frequency of the transmitter clock; and
   switching the CDR circuit to the phase mode such that the receiver clock follows the frequency of the outer data signal.

6. The frequency adjusting method according to claim 1, further comprising:
   sending the outer data signal from the outer apparatus to the receiver apparatus.

7. A receiver apparatus, for receiving an outer data signal of an outer apparatus, comprising:
   a phase-lock loop (PLL), for outputting a transmitter clock according to an operational frequency of the receiver apparatus;
   a CDR circuit, for receiving the outer data signal and outputting a receiver clock, wherein the receiver clock follows the outer data signal when the CDR circuit is set in a phase mode and follows the transmitter clock when the CDR circuit is set in a frequency mode;
   a frequency detector, for detecting the difference between the frequencies of the receiver clock and the transmitter clock and outputting a dispersion detective signal according to the difference; and
   a reset controller, for sending out a reset signal to the CDR circuit to restart the CDR circuit when the frequency detector outputs the dispersion detective signal;

wherein when the CDR circuit is set in the phase mode, and the frequency detector outputs the dispersion detective signal, the CDR circuit is restarted and switched to the frequency mode, otherwise, the CDR circuit remains in the phase mode.

8. The receiver apparatus according to claim 7, further comprising a controller for switching the CDR circuit between the phase mode and the frequency mode.

9. The receiver apparatus according to claim 8, wherein when the frequency detector outputs the dispersion detective signal, the controller switches the CDR circuit to the frequency mode.

10. The receiver apparatus according to claim 7, wherein when the difference between the frequencies of the receiver clock and the transmitter clock is larger than a threshold value, the frequency detector outputs the dispersion detective signal.

11. The receiver apparatus according to claim 10, wherein the threshold value is a difference between the maximum operational frequency of the receiver apparatus and a predetermined operational frequency, or a rational optimal value.

12. The receiver apparatus according to claim 7, wherein when the frequency of the receiver clock differs from the frequency of the transmitter clock, the frequency detector outputs the dispersion detective signal.

13. The receiver apparatus according to claim 7, wherein when the outer apparatus is connected to the receiver apparatus, the CDR circuit is operated in the frequency mode first and then switched to the phase mode.

14. The receiver apparatus according to claim 7, wherein if the outer apparatus does not receive a response from the receiver apparatus within a predetermined time, the outer apparatus is switched to have an operational frequency the same as the operational frequency of the receiver apparatus.

15. A frequency adjusting method of a receiver apparatus including a clock/data recovery (CDR) circuit that generates a receiver clock, the receiver apparatus operating in a first operational frequency, the receiver apparatus connected to an outer apparatus and adjusting the receiver clock for receiving an outer data signal, the outer apparatus operating in a second operational frequency, the frequency adjusting method comprising:
(a) setting the receiver clock to follow the second operational frequency;
(b) detecting whether the receiver clock has a frequency beyond a normal operational value when the receiver clock follows the second operational frequency;
(c) when the receiver clock is beyond the normal operational value, restarting the CDR circuit of the receiver apparatus and setting the receiver clock to operate at the first operational frequency; and
(d) setting the outer apparatus to operate in the first operational frequency when the outer apparatus does not receive a response from the receiver apparatus within a predetermined time,
wherein the receiver clock follows the first operational frequency when the receiver apparatus is not connected to the outer apparatus.

16. The frequency adjusting method according to claim 15, wherein the outer apparatus can be operated in the first operational frequency and the second operational frequency.

17. The frequency adjusting method according to claim 15, wherein the first operational frequency is lower than the second operational frequency.

18. The frequency adjusting method according to claim 15, wherein the normal operational value is the first operational frequency plus a threshold value.

19. The frequency adjusting method according to claim 15, wherein the normal operational value is the first operational frequency.

20. The frequency adjusting method according to claim 15, wherein when the receiver clock has a frequency within the normal operational value, the receiver clock keeps following the second operational frequency.

21. The frequency adjusting method according to claim 15, wherein the outer apparatus is set to operate in the first operational frequency according to restarting of the CDR circuit of the receiver apparatus.

* * * * *